(12) United States Patent
Nakada et al.

(10) Patent No.: US 10,214,666 B2
(45) Date of Patent: Feb. 26, 2019

(54) OPTICALLY CLEAR ADHESIVES FOR DURABLE PLASTIC BONDING

(71) Applicant: 3M INNOVATIVE PROPERTIES COMPANY, St. Paul, MN (US)

(72) Inventors: Aya Nakada, Kanagawa ken (JP); Hideyuki Hatanaka, Tokyo (JP); Masaki Yoda, Tokyo (JP); Toshihiro Suwa, Tokyo (JP); Albert I. Everaerts, Oakdale, MN (US); Shunsuke Suzuki, Tokyo (JP); Yasuhiro Kinoshita, Tokyo (JP)

(73) Assignee: 3M Innovative Properties Company, Saint Paul, MN (US)

( * ) Notice: Subject to any disclaimer, the term of this patent is extended or adjusted under 35 U.S.C. 154(b) by 218 days.

(21) Appl. No.: 15/038,863

(22) PCT Filed: Dec. 3, 2014

(86) PCT No.: PCT/US2014/068375
§ 371 (c)(1),
(2) Date: May 24, 2016

(87) PCT Pub. No.: WO2015/084960
PCT Pub. Date: Jun. 11, 2015

(65) Prior Publication Data
US 2017/0015877 A1 Jan. 19, 2017

Related U.S. Application Data

(60) Provisional application No. 61/911,573, filed on Dec. 4, 2013.

(51) Int. Cl.
*C09J 133/06* (2006.01)
*C08F 290/04* (2006.01)
(Continued)

(52) U.S. Cl.
CPC ............ *C09J 133/066* (2013.01); *B32B 7/12* (2013.01); *C08F 290/046* (2013.01); *C09J 155/005* (2013.01); *B32B 2457/20* (2013.01)

(58) Field of Classification Search
CPC ............... C09J 133/066; C09J 155/005; C08F 290/046; B32B 7/12; B32B 2457/20
(Continued)

(56) References Cited

U.S. PATENT DOCUMENTS

| 6,838,142 B2 * | 1/2005 | Yang ................. B32B 17/10018 |
| | | 428/40.1 |
| 7,927,703 B2 * | 4/2011 | Xia ........................... B32B 7/12 |
| | | 428/412 |

(Continued)

FOREIGN PATENT DOCUMENTS

| EP | 027521 | 4/1981 |
| JP | 2010-150400 | 7/2010 |

(Continued)

OTHER PUBLICATIONS

International Search Report for PCT International Application No. PCT/US2014/068375, dated Feb. 16, 2015, 3 pgs.

*Primary Examiner* — Michael Bernshteyn (57) ABSTRACT

The present invention is a copolymer of a monomer mixture including about 25 to about 80 parts by mass of an alkyl (meth)acrylate, approximately 15 to approximately 50 parts by mass of a hydroxyl group-containing monomer, and approximately 5 to approximately 25 parts by mass of a macromer having a glass transition temperature (Tg) of approximately 50° C. or higher. The copolymer contains substantially no acidic groups.

6 Claims, 1 Drawing Sheet

(51) Int. Cl.
*C09J 155/00* (2006.01)
*B32B 7/12* (2006.01)

(58) Field of Classification Search
USPC .......................................................... 428/522
See application file for complete search history.

(56) References Cited

U.S. PATENT DOCUMENTS

| | | | |
|---|---|---|---|
| 8,361,632 B2 * | 1/2013 | Everaerts | C09J 171/02 428/520 |
| 8,361,633 B2 * | 1/2013 | Everaerts | B32B 27/00 428/339 |
| 2011/0033720 A1 * | 2/2011 | Fujita | C09J 133/14 428/522 |
| 2011/0177329 A1 | 7/2011 | Xia | |
| 2012/0328864 A1 | 12/2012 | Takarada | |
| 2013/0005915 A1 | 1/2013 | Suzuki | |

FOREIGN PATENT DOCUMENTS

| | | | |
|---|---|---|---|
| JP | 2013/018227 | 1/2013 | |
| JP | 2013018227 A * | 1/2013 | |
| WO | WO 2010-040014 | 4/2010 | |
| WO | WO 2013-013590 | 1/2013 | |
| WO | WO-2013013590 A1 * | 1/2013 | ........... C08G 18/672 |

* cited by examiner

OPTICALLY CLEAR ADHESIVES FOR DURABLE PLASTIC BONDING

FIELD OF THE INVENTION

The present invention relates to an optically clear adhesive and an optical laminate containing the optically clear adhesive.

BACKGROUND

Optically clear adhesives (hereinafter referred to as "OCA") are widely used in order to bond constituent components of optical laminates such as touch panels, for example, a surface protection material (cover lens) to a touch panel module. Display units provided with touch panels can be used in a variety of environmental conditions, such as high temperature and/or high humidity depending on the intended use of the display unit. In addition to maintaining high transparency under such environmental conditions, OCAs need to exhibit characteristics such as heat resistance and resistance to moist heat. These characteristics can be evaluated by investigating whether or not bubbling, peeling, clouding or white opacity or the like occurs in an optical laminate when an optical laminate that contains an OCA is subjected to an accelerated aging test under conditions of high temperature/high humidity.

Bubbling and peeling, which can occur in optical laminates, are caused by outgas produced from materials that constitute optical laminates, differences in coefficient of thermal expansion between constituent materials, and the like. For example, plastic films used as cover lenses for touch panel modules, such as poly(methyl methacrylate) (PMMA) or polycarbonates (PC), can produce outgas under high temperature conditions, thereby leading to bubbling or peeling between these films and a touch panel module. Meanwhile, under moist heat conditions, moisture vapor from the outside can penetrate from the sides of a touch panel, pass through these films or condense inside a touch panel when the touch panel is cooled, thereby causing clouding or white opacity inside the touch panel.

In terms of the structure of a touch panel, OCAs need to not cause loss of electrical conductivity in cases where an OCA can come into contact with an electrically conductive layer that forms a circuit on a touch panel. Electrically conductive layers are formed from metals or metal oxides, such as gold, silver, copper, aluminum, indium tin oxide (ITO) or antimony tin oxide (ATO), and there are concerns that the resistance of an electrically conductive layer will increase as a result of corrosion if the electrically conductive layer comes into contact with an acidic component.

In recent years, plastic panels such as poly(methyl methacrylate) (PMMA), polycarbonates (PCs) and cycloolefin polymers (COPs) have been used as touch panel modules for automotive applications in particular, due to being lightweight, flexible, inexpensive, safe, and so on. Both conventional cast molded articles and in-mold molded articles are used in touch panel modules having three-dimensional shapes. In cases where an OCA is used to bond a cover lens to a touch panel module that includes this type of plastic panel or molded article, both the cover lens and the plastic panel or molded article are involved in the generation of outgas and the transmission of moisture vapor, and it is therefore difficult to prevent bubbling, peeling, clouding or white opacity in a touch panel. In addition, touch panels designed to be outdoors for long periods of time, such as automotive touch panels, require superior heat resistance and resistance to moist heat compared to conventional touch panels.

Patent Document 1 (Japanese Unexamined Patent Application Publication (Translation of PCT Application) No. 2012-504512) discloses "an optically clear laminate comprising: a first base material having at least one major surface; a second base material having at least one major surface; and a cloud point-resistant, optically clear adhesive composition situated between and in contact with at least one major surface of the aforementioned first base material and at least one major surface of the aforementioned second base material, wherein the aforementioned adhesive composition is derived from precursors that comprise: from about 60 to about 95 parts by weight of an alkyl acrylate having 1 to 14 carbon atoms in the alkyl group; from 0 to about 5 parts of a copolymerizable polar monomer; and from about 5 to about 50 parts of a hydroxyl-containing monomer that has an OH equivalent weight of less than 400".

Patent Document 2 (WO/2010/040014 (Japanese Unexamined Patent Application Publication No. 2013-018227)) discloses "a laminate has a base material, an tacky adhesive layer; and a conductive layer, laminated in this order, wherein the aforementioned tacky adhesive layer contains (A) a (meth)acrylic polymer, which has a weight average molecular weight of 50 thousand or higher and less than 400,000, contains substantially no acid groups and is obtained by copolymerizing 0.1 to 10 wt. % of a (meth) acrylic monomer having a crosslinkable functional group and 0.1 to 30 wt. % of a macromer (relative to 100 wt. % of the total monomer quantity), and (B) a crosslinking agent, wherein the aforementioned macromer has a polymerizable unsaturated group, has a glass transition temperature of 50 to 180° C. and a weight average molecular weight of 500 to 100,000".

SUMMARY OF THE INVENTION

The present invention provides an optically clear adhesive having excellent heat resistance and resistance to moist heat, and an optical laminate that uses the adhesive. One embodiment of the present invention provides an optically clear adhesive which contains a copolymer of a monomer mixture containing approximately 25 to approximately 80 parts by mass of an alkyl (meth)acrylate, approximately 15 to approximately 50 parts by mass of a hydroxyl group-containing monomer, and approximately 5 to approximately 25 parts by mass of a macromer having a glass transition temperature (Tg) of 50° C. or higher, wherein the copolymer contains substantially no acidic groups.

Another embodiment of the present invention provides an optical laminate which contains a first base material having a major surface, a second base material having a major surface, and the above-mentioned optically clear adhesive, which is disposed between the major surface of the aforementioned first base material and the major surface of the aforementioned second base material so as to be in contact with the major surface of the aforementioned first base material and the major surface of the aforementioned second base material.

Because the copolymer contained in the optically clear adhesive of the present invention contains a large quantity of a hydrophilic moiety derived from a hydroxyl group-containing monomer and contains a macromer having a high Tg value in the copolymer structure, it is possible to prevent clouding or white opacity caused by condensation of moisture while ensuring adhesion to a base material due to high cohesive force and preventing bubbling and peeling caused by outgas. Therefore, according to the present invention, it is possible to obtain an optically clear adhesive and optical laminate having excellent heat resistance and resistance to moist heat. In addition, because the copolymer contains substantially no acidic groups, it is possible to prevent, avoid, or suppress corrosion of electrically conductive layers in cases where the optical laminate contains metal or metal oxide electrically conductive layers. The optically clear adhesive and optical laminate of the present invention can be advantageously used in applications where optical transparency is required even in high temperature and high humidity environments that are harsher than those in the past, such as automotive touch panels and optical displays.

Note that the above descriptions should not be construed to be a disclosure of all of the embodiments and benefits of the present invention.

DETAILED DESCRIPTION

A detailed description for the purpose of illustrating representative embodiments of the present invention is given below, but these embodiments should not be construed as limiting the present invention.

In the present invention, "adhesive" includes both permanent adhesives and pressure-sensitive adhesives (tacky adhesives). A pressure-sensitive adhesive may be repositionable and may function as a permanent adhesive by being subjected to a post-application treatment such as heating or irradiation with ultraviolet radiation.

In the present invention, "(meth)acrylic" refers to "acrylic or methacrylic", and (meth)acrylate" refers to "acrylate or methacrylate".

In the present invention, "optically clear" means a material having a luminous transmittance of approximately 90% or higher and a haze value of approximately 2% or lower across the wavelength range 400 to 700 nm. Luminous transmittance can be determined in accordance with JIS K 7361 (1997), and haze can be determined in accordance with JIS K 7136 (2000). "Optically clear" generally means a state whereby air bubbles cannot be visually observed.

In the present invention, "the copolymer contains substantially no acidic groups" means that monomers having acidic groups are intentionally not used when the copolymer is formed, and acidic groups derived from such monomers are not contained in the copolymer. More specifically, the acid value of a copolymer that contains substantially no acidic groups is, for example, approximately 5 mg KOH/g or lower, approximately 2 mg KOH/g or lower, or approximately 0.5 mg KOH/g or lower. In one embodiment, the copolymer contains no acidic groups.

In the present invention, "the copolymer contains substantially no nitrogen-containing sites" means that monomers and crosslinking agents having nitrogen atom-containing functional groups, such as amino groups, imino groups, isocyanate groups, nitrile groups, amide groups or imide groups, are intentionally not used when the copolymer is formed or, if necessary, crosslinked, and nitrogen atom-containing bonds or sites derived from such monomers and crosslinking agents, such as amide bonds, imide bonds, urethane bonds or urea bonds, are not contained in the copolymer. More specifically, the nitrogen content determined when a copolymer that contains substantially no nitrogen-containing sites is subjected to elemental analysis by a combustion method is, for example, approximately 1 mass % or lower, approximately 0.1 mass % or lower, approximately 0.02 mass % or lower, or lower than the detection limit. Elemental analysis by a combustion method can be carried out by using a TruSpec (registered trademark) Micro CHNS micro organic element analyzer (manufactured by Leco Japan Corporation, Minato-ku, Tokyo, Japan). In on embodiment, the copolymer contains no nitrogen-containing sites.

In the present invention, "storage modulus (G')" means the storage modulus at the specified temperature when viscoelasticity is measured in a 1.0 Hz shear mode and a rate of temperature increase of 5° C./min within the temperature range −40° C. to 200° C.

The optically clear adhesive (OCA) according to one embodiment of the present invention contains a copolymer of a monomer mixture containing approximately 25 to approximately 80 parts by mass of an alkyl (meth)acrylate, approximately 15 to approximately 50 parts by mass of a hydroxyl group-containing monomer, and approximately 5 to approximately 25 parts by mass of a macromer having a glass transition temperature (Tg) of 50° C. or higher. The copolymer contains substantially no acidic groups.

An alkyl (meth)acrylate is a main component that constitutes the copolymer contained in the OCA. It is possible to use a straight chain, branched chain or cyclic monofunctional (meth)acrylate having 1 to 14 carbon atoms in the alkyl group as the alkyl (meth)acrylate.

Examples of useful alkyl (meth)acrylates include methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, isoamyl (meth)acrylate, 2-methylbutyl (meth)acrylate, n-hexyl (meth)acrylate, n-octyl (meth)acrylate, 2-ethylhexyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, cyclohexyl (meth)acrylate, isobornyl (meth)acrylate, and the like, and combinations thereof. In cases where a copolymer is formed by polymerizing a monomer mixture by irradiating with radiation such as ultraviolet radiation or an electron beam, it is advantageous for the alkyl (meth)acrylate to be a highly reactive alkyl acrylate.

Because compatibility with a macromer is good when the monomer mixture is a solvent-free system, it is advantageous for the number of carbon atoms in the alkyl group in the alkyl (meth)acrylate to be approximately 1 to approximately 8, and especially approximately 2 to approximately 6. In certain embodiments, the alkyl (meth)acrylate contains at least one compound selected from among the group consisting of n-butyl acrylate, isobutyl acrylate and 2-ethylhexyl acrylate. In other embodiments, the alkyl (meth)acrylate contains n-butyl acrylate. The monomer n-butyl acrylate is particularly excellent in terms of compatibility with a macromer in which the main chain has methyl methacrylate units, which is described below. In some embodiments, an alkyl (meth)acrylate in which the number of carbon atoms in the alkyl group is approximately 1 to approximately 8, and especially approximately 2 to approximately 6 constitutes approximately 50 mass % or more, approximately 60 mass % or more or approximately 80 mass % or more and approximately 95 mass % or less, approximately 90 mass % or less or approximately 85 mass % or less, of the alkyl (meth)acrylate.

It is possible to increase the cohesive force of the adhesive by using a cyclic (meth)acrylate having a relatively rigid structure, such as cyclohexyl (meth)acrylate or isobornyl (meth)acrylate. In certain embodiments, the alkyl (meth)acrylate contains at least one compound selected from among the group consisting of cyclohexyl methacrylate and isobornyl methacrylate. In some embodiments, these cyclic (meth)acrylates constitute approximately 2 mass % or more, approximately 5 mass % or more or approximately 10 mass % or more and approximately 35 mass % or less, approximately 30 mass % or less or approximately 25 mass % or less, of the alkyl (meth)acrylate.

The hydroxyl group-containing monomer is such that the hydroxyl groups, which are hydrophilic, contribute to an improvement in the moisture vapor transmission rate of the OCA, a prevention of moisture condensation, and so on. Hydrogen bonding via hydroxyl groups can, in some cases, enhance the cohesive force of the OCA. It is possible to use a monomer having an ethylenically unsaturated group and having a hydroxyl group equivalent of less than approximately 400 g/mol as the hydroxyl group-containing monomer. The hydroxyl group equivalent is defined as the value obtained by dividing the molecular weight of the hydroxyl group-containing monomer by the number of moles of hydroxyl groups. The number of hydroxyl groups in the hydroxyl group-containing monomer can be 1 or 2 or more.

Examples of useful hydroxyl group-containing monomers include hydroxyl group-containing (meth)acrylates such as 2-hydroxyethyl (meth)acrylate, 2-hydroxypropyl (meth)acrylate, 3-hydroxypropyl (meth)acrylate and 4-hydroxybutyl (meth)acrylate, hydroxyl group-containing (meth)acrylamides such as 2-hydroxyethyl (meth)acrylamide and N-hydroxypropyl (meth)acrylamide, and combinations thereof. It is also possible to use a hydroxy-functional monomer derived from a glycol derived from ethylene oxide or propylene oxide. One example of this type of monomer is poly(propylene glycol) (meth)acrylate having hydroxyl groups as terminal groups, which can be obtained as Bisomer PPA 6 from Cognis, Germany. In cases where a copolymer is formed by polymerizing a monomer mixture by irradiating with radiation such as ultraviolet radiation or an electron beam, it is advantageous for the hydroxyl group-containing monomer to be a highly reactive hydroxyl group-containing acrylate.

In cases where an OCA is used on a base material including a metal such as copper or aluminum, it is possible to prevent corrosion or discoloration of these metals by using a hydroxyl group-containing monomer that contains no nitrogen atoms, for example a hydroxyl group-containing monomer such as 2-hydroxyethyl (meth)acrylate, 2-hydroxypropyl (meth)acrylate, 3-hydroxypropyl (meth)acrylate or 4-hydroxybutyl (meth)acrylate. Because compatibility with a macromer is good when the monomer mixture is a solvent-free system, in one embodiment, 2-hydroxyethyl (meth)acrylate, 2-hydroxypropyl (meth)acrylate, 3-hydroxypropyl (meth)acrylate or 4-hydroxybutyl (meth)acrylate is used, and more particularly, 2-hydroxypropyl (meth)acrylate is used. In certain embodiments, the hydroxyl group-containing monomer is 2-hydroxypropyl acrylate. 2-hydroxypropyl acrylate is particularly excellent in terms of compatibility with a macromer in which the main chain has methyl methacrylate units.

A "macromer" (also known as a macromonomer) is a high molecular weight monomer having a functional group that is polymerizable with other monomers, for example an ethylenically unsaturated group such as a (meth)acryloyl group, a vinyl group or a styryl group. An example of a particular macromer is one having a glass transition temperature (Tg) of approximately 50° C. or higher and constitutes a hard segment as a side chain of a copolymer by being polymerized with the acrylic (meth)acrylate and the hydroxyl group-containing monomer. By using such a macromer, it is possible to provide an OCA with increased cohesive strength while maintaining the wettability of the OCA and which is excellent in terms of minimizing outgassing, that is, an OCA in which bubbling and peeling hardly occur when the OCA is used on a plastic base material. The glass transition temperature (Tg) value of the macromer can be determined from the mass ratios of the monomers that constitute the main chain of the macromer by using the Fox equation shown below, which is disclosed in Fox, T. G., Bull. Am. Phys. Soc., 1, 123.

$$1/Tg = (W_1/Tg_1) + (W_2/Tg_2) + \ldots + (W_m/Tg_m)$$

$$W_1 + W_2 + \ldots + W_m = 1 \qquad \text{Equation 1}$$

In the equation, Tg denotes the glass transition temperature of the macromer, and $Tg_1$, $Tg_2$, ..., $Tg_m$ each denote the glass transition temperature of a homopolymer obtained by polymerizing the monomers in isolation. $W_1$, $W_2$, ..., $W_m$ each denote the proportion by mass of each monomer that constitutes the main chain of the macromer.

The glass transition temperature (Tg) of the macromer is approximately 50° C. or higher, approximately 60° C. or higher, or approximately 80° C. or higher, and approximately 200° C. or lower, approximately 180° C. or lower, or approximately 150° C. or lower. The Tg value of the macromer can be selected according to the composition of the alkyl (meth)acrylate used, the required adhesive strength, and so on.

Examples of monomers that constitute the main chain of the macromer include methacrylate monomers such as methyl methacrylate, ethyl methacrylate, n-butyl methacrylate, isobutyl methacrylate, tert-butyl methacrylate and 2-ethylhexyl methacrylate, styrene-based monomers such as styrene and α-methylstyrene, and acrylonitrile. In order for compatibility between the alkyl (meth)acrylate and the hydroxyl group-containing monomer to be good, and in order to effectively increase the cohesive force of the OCA, the main chain of the macromer particularly contains at least one unit selected from among methyl methacrylate units, tert-butyl methacrylate units and styrene units. More particularly, the main chain of the macromer contains methyl methacrylate units, which are believed to improve properties such as heat resistance and transparency. When using n-butyl acrylate as the alkyl (meth)acrylate and 2-hydroxypropyl acrylate as the hydroxyl group-containing monomer, a macromer having methyl methacrylate units in the main chain dissolves particularly well in the monomer mixture. Therefore, in cases where the monomer mixture is a solvent-free system, it is particularly advantageous for the monomer mixture to contain a combination of a macromer having methyl methacrylate units in the main chain and at least one of n-butyl acrylate and 2-hydroxyethyl acrylate.

The number average molecular weight (Mn) of the macromer in daltons is approximately 2,000 or higher, approximately 2,500 or higher or approximately 3,000 or higher, and approximately 50,000 or lower, approximately 30,000 or lower or approximately 20,000 or lower. By setting the number average molecular weight to fall within the above-mentioned range, it is easy to dissolve the macromer in another monomer. In the present invention, the number average molecular weight is the number average molecular weight in terms of polystyrene standards, as measured by gel permeation chromatography (GPC).

Examples of such macromers include a macromer in which the terminals are methacryloyl groups and the monomer that constitutes the main chain is methyl methacrylate (MMA) (product name AA-6, obtainable from Toagosei Co., Ltd., Minato-ku, Tokyo, Japan), a macromer in which the monomer that constitutes the main chain is styrene (product name AS-6, obtainable from Toagosei Co., Ltd., Minato-ku, Tokyo, Japan) and a macromer in which the monomers that constitutes the main chain are styrene and acrylonitrile (the main chain is a styrene-acrylonitrile copolymer) (product name AN-6S, obtainable from Toagosei Co., Ltd., Minato-ku, Tokyo, Japan).

The monomer mixture may contain a crosslinkable monomer as an optional component. The crosslinkable monomer introduces a crosslinked structure into the copolymer during the polymerization process. This is different from a crosslinked structure formed by reacting hydroxyl groups present in the copolymer with an isocyanate-containing crosslinking agent, an epoxy-containing crosslinking agent, or the like. By copolymerizing a crosslinkable monomer, it is possible to introduce a crosslinked structure into the copolymer without consuming hydroxyl groups derived from the hydroxyl group-containing monomer, which contributes to the moisture vapor transmission rate of the OCA. In addition, crosslinking by using a crosslinkable monomer forms a crosslinked structure during the polymerization process, and therefore does not require a subsequent curing process, particularly in cases where a solvent-free monomer mixture is used. In another embodiment, the monomer mixture does not contain a crosslinkable monomer and a copolymer obtained from this monomer mixture does not have a crosslinked structure derived this type of crosslinkable monomer.

Examples of crosslinkable monomers include difunctional (meth)acrylates such as 1,4-butane diol di(meth)acrylate, 1,6-hexane diol di(meth)acrylate, 1,9-nonane diol di(meth)acrylate, 1,10-decane diol di(meth)acrylate, neopentyl glycol di(meth)acrylate, ethylene glycol di(meth) acrylate, di(ethylene glycol) di(meth)acrylate, tri(ethylene glycol) di(meth)acrylate, an ethoxylated bisphenol A di(meth)acrylate, tricyclodecane dimethanol di(meth)acrylate, poly(ethylene glycol) di(meth)acrylate, poly(propylene glycol) di(meth)acrylate, and 2-hydroxy-3-acryloyloxypropyl (meth)acrylate; and polyfunctional (meth)acrylates such as trimethyloylpropane tri(meth)acrylate, pentaerythritol tri (meth)acrylate, pentaerythritol tetra(meth)acrylate, di(trimethylolpropane) tetra(meth)acrylate, dipentaerythritol penta (meth)acrylate and dipentaerythritol hexa(meth)acrylate. Of these crosslinkable monomers, difunctional (meth)acrylates can be advantageously used due to ease of controlling the adhesive characteristics of the OCA. In cases where a copolymer is formed by polymerizing a monomer mixture by irradiating with radiation such as ultraviolet radiation or an electron beam, it is advantageous for the crosslinkable monomer to be a highly reactive difunctional acrylate or polyfunctional acrylate.

The monomer mixture may contain, as an optional component, an additional monomer other than those mentioned above. Examples of such additional monomers include alkoxy (meth)acrylates such as methoxymethyl (meth)acrylate, methoxyethyl (meth)acrylate, methoxybutyl (meth) acrylate, ethoxymethyl (meth)acrylate, ethoxyethyl (meth) acrylate and ethoxybutyl (meth)acrylate; alkoxyalkylene glycol (meth)acrylates such as methoxydi(ethylene glycol) acrylate, ethoxydi(ethylene glycol) (meth)acrylate, methoxytri(ethylene glycol) (meth)acrylate and ethoxytri (ethylene glycol) (meth)acrylate; aromatic (meth)acrylates such as phenyl (meth)acrylate and benzyl (meth)acrylate; styrene-based monomers such as styrene and α-methylstyrene; nitrogen-containing (meth)acrylic monomers such as dimethylaminoethyl (meth)acrylate, diethylaminoethyl (meth)acrylate, (meth)acrylamide, N-methyl (meth)acrylamide, N-ethyl (meth)acrylamide, N-propyl (meth)acrylamide, N-hexyl (meth)acrylamide, N,N-dimethyl (meth)acrylamide, (meth)acrylonitrile and cyano (meth)acrylate; nitrogen-containing monomers N-vinyl caprolactam and N-vinyl pyrrolidone; vinyl acetate and methyl itaconate.

In some embodiments, in cases where the OCA is used on a base material having a metal such as copper or aluminum, the additional monomer contains no nitrogen atoms, or in other words, the monomer is a monomer other than a nitrogen-containing (meth)acrylic monomer or a nitrogen-containing monomer, in order to prevent corrosion or discoloration of these metals.

In some embodiments, the monomer mixture contains or comprises approximately 25 parts by mass or more, approximately 30 parts by mass or more, or approximately 40 parts by mass or more, and approximately 80 parts by mass or less, approximately 75 parts by mass or less, or approximately 70 parts by mass or less of the alkyl (meth)acrylate; approximately 15 parts by mass or more, approximately 20 parts by mass or more, or approximately 25 parts by mass or more, and approximately 50 parts by mass or less, approximately 45 parts by mass or less, or approximately 40 parts by mass or less of the hydroxyl group-containing monomer; and approximately 5 parts by mass or more, approximately 6 parts by mass or more, or approximately 8 parts by mass or more, and approximately 25 parts by mass or less, approximately 20 parts by mass or less, or approximately 18 parts by mass or less of the macromer.

In embodiments in which the monomer mixture contains a crosslinkable monomer, the crosslinkable monomer is contained in the monomer mixture at a quantity of approximately 0.01 parts by mass or higher, approximately 0.02 parts by mass or higher or approximately 0.05 parts by mass or higher and approximately 5 parts by mass or lower, approximately 2 parts by mass or lower or approximately 1 part by mass or lower when the total quantity of the alkyl (meth)acrylate, the hydroxyl group-containing monomer, and the macromer is 100 parts by mass.

In embodiments in which the monomer mixture contains the above-mentioned additional monomer, the additional monomer is contained in the monomer mixture at a quantity of approximately 0.1 parts by mass or higher, approximately 0.2 parts by mass or higher or approximately 0.5 parts by mass or higher and approximately 10 parts by mass or lower, approximately 5 parts by mass or lower or approximately 2 parts by mass or lower when the total quantity of the alkyl (meth)acrylate, the hydroxyl group-containing monomer and the macromer is 100 parts by mass.

When polymerizing the monomer mixture, it is possible to use a polymerization initiator selected from among thermal polymerization initiators and photopolymerization initiators. Examples of useful polymerization initiators include peroxides such as benzoyl peroxide and derivatives thereof, and azo compounds such as 2,2'-azobis-(2-methylbutyronitrile) (product name VAZO 67, obtainable from E.I. du Pont de Nemours and Co., Wilmington, Del.), dimethyl-2,2'-azobisisobutyrate (product name V-601, obtainable from Wako Specialty Chemicals, Richmond, Va.) and 2,2'-azobis (2,4-dimethylvaleronitrile (product name V-65, obtainable from Wako Pure Chemical Industries, Ltd., Osaka City, Osaka Prefecture, Japan). A variety of peroxides and azo compounds can be obtained that permit initiation of thermal polymerization across a wide range of temperatures. Examples of useful photopolymerization initiators include 2,2-dimethoxy-2-phenylacetophenone (IRGACURE (registered trademark) 651, obtainable from BASF Japan, Minato-ku, Tokyo, Japan), and the like. The polymerization initiator is generally used at a quantity of approximately 0.05 parts by mass or higher or approximately 0.1 parts by mass or higher and approximately 2 parts by mass or lower or approximately 1 part by mass or lower relative to 100 parts by mass of the monomer mixture.

It is possible to form the copolymer contained in the OCA by subjecting the monomer mixture, to which these polymerization initiators have been added, to polymerization by using heat or radiation such as ultraviolet radiation or an electron beam, and crosslinking in cases where a crosslinkable monomer is present. In cases where the viscosity of the monomer mixture is suitable for coating, it is possible to form a sheet or film of the OCA on a liner by coating the monomer mixture on a liner and then carrying out the above-mentioned polymerization and, if necessary, crosslinking.

In cases where the viscosity of the monomer mixture is low, a coatable viscous liquid can be formed by adding a part of the polymerization initiator to the monomer mixture that does not contain a crosslinkable monomer and then partially polymerizing the monomer mixture. Next, a sheet or film of the OCA can be formed on a liner by adding the remaining polymerization initiator and, if necessary, the crosslinkable monomer to the viscous liquid and then coating the viscous liquid on a liner, and polymerizing and, if necessary, crosslinking it.

The monomer mixture can be coated by using a variety of already known coating techniques, such as roll coating, spray coating, knife coating, or die coating. Alternatively, the monomer mixture can be polymerized and, if necessary, crosslinked by filling the monomer mixture as a liquid between two base materials and using heat or radiation such as ultraviolet radiation or an electron beam.

The monomer mixture may, if necessary, contain a solvent such as acetone, methyl ethyl ketone, ethyl acetate or toluene. In certain embodiments, the monomer mixture does not contain a solvent, or in other words, is a solvent-free system. A solvent-free monomer mixture does not require solvent removal following polymerization, and can therefore be advantageously used in a polymerization step using irradiation by radiation such as ultraviolet radiation or an electron beam.

In one embodiment, the polymerization and, if necessary, crosslinking of the monomer mixture, is carried out using radiation such as ultraviolet radiation or an electron beam, and especially ultraviolet radiation. When polymerizing by irradiating with radiation, unlike thermal polymerization, it is possible to easily change the quantity of active species derived from the initiator, which are generated during polymerization, by controlling the radiation dose. By changing the quantity of active species, it is possible to tightly control the molecular weight of the copolymer and provide an OCA having the desired adhesive properties.

A copolymer obtained in this way contains substantially no acidic groups. By not using a monomer having a carboxyl group, such as (meth)acrylic acid, maleic acid or itaconic acid, a monomer having a phosphate group, a monomer having a sulfate group, and the like when preparing the copolymer, it is possible prevent, avoid, or suppress corrosion of electrically conductive layers even in cases where the optical laminate contains metal or metal oxide electrically conductive layers.

In certain embodiments, the copolymer contains substantially no nitrogen-containing sites. It is possible to obtain such a copolymer by not using a crosslinkable monomer or a monomer having a nitrogen atom-containing functional group, such as an amino group, an imino group, an isocyanate group, a nitrile group, an amide group or an imide group, in the monomer mixture. When used on a base material having a metal such as copper or aluminum, an OCA that contains a copolymer containing substantially no nitrogen-containing sites can prevent, avoid, or suppress corrosion or discoloration of these metals. Therefore, an OCA that contains the copolymer of this embodiment can be advantageously used in base materials including copper conductors, and especially copper conductors having no passivation films, such as touch panels, the number of which has increased in recent years. In addition, a copolymer containing substantially no nitrogen-containing sites can effectively prevent, avoid, or suppress yellowing of plastic base materials.

The OCA may contain a silane coupling agent as an optional component. By adding a silane coupling agent to the OCA, it is possible to increase adhesion between the OCA and a base material. In addition, by using a silane coupling agent, it can be possible to prevent an increase in resistance of an electrically conductive layer formed from a metal or metal oxide such as gold, silver, copper, aluminum, indium tin oxide (ITO) or antimony tin oxide (ATO). The silane coupling agent can be added to the monomer mixture before the OCA is formed.

Examples of useful silane coupling agents include alkylsilanes such as hexyltrimethoxysilane, hexyltriethoxysilane and decyltrimethoxysilane; aromatic ring-containing silanes such as phenyltriethoxysilane and p-styryltrimethoxysilane; vinylsilanes such as vinyl trimethoxysilane and vinyl triethoxysilane; epoxysilanes such as 2-(3,4-epoxycyclohexyl) ethyl trimethoxysilane, 3-glycidoxypropyl methyldimethoxysilane, 3-glycidoxypropyltrimethoxysilane, 3-glycidoxypropylmethoxydimethoxysilane and 3-glycidoxypropyltriethoxysilane; (meth)acrylic silanes such as 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane; and aminosilanes such as N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane and 3-aminopropyltriethoxysilane. In some embodiments, in cases where the OCA is used on a base material including a metal such as copper or aluminum, an alkylsilane, an aromatic ring-containing silane, an epoxysilane or a (meth)acrylic silane is used. Of these silane coupling agents, it is particularly advantageous to use an epoxysilane in order to more effectively suppress an increase in resistance of the electrically conductive layers. The silane coupling agent can be used at a quantity of approximately 0.05 parts by mass or higher or approximately 0.1 parts by mass or higher and approximately 2 parts by mass or lower or approximately 1 part by mass or lower relative to 100 parts by mass of the OCA.

If necessary, a tackifier can be added to the monomer mixture before the OCA is formed. Examples of useful tackifiers include rosin ester resins, aromatic hydrocarbon resins, aliphatic hydrocarbon resins, and terpene resins. In certain embodiments, it is possible to use a pale colored tackifier selected from among hydrogenated rosin esters, terpenes, and aromatic hydrocarbon resins. The tackifier can be used at a quantity of approximately 1 part by mass or higher or approximately 2 parts by mass or higher and approximately 10 parts by mass or lower or approximately 5 parts by mass or lower relative to 100 parts by mass of the OCA.

As long as the optical transparency of the OCA is not significantly impaired, additives such as oils, plasticizers, antioxidants, UV stabilizers, pigments, curing agents and polymer additives can be added according to the intended use of the OCA.

In some embodiments, the storage modulus (G') of the OCA at 25° C. and 1 Hz is approximately 10,000 Pa or higher or approximately 100,000 Pa or higher and approximately 10,000,000 Pa or lower or approximately 500,000 Pa or lower.

The moisture vapor transmission rate (MVTR) is one characteristic by which the resistance to moist heat of the OCA can be evaluated and can be determined in accordance with JIS Z 0208 (1976). In some embodiments, the moisture vapor transmission rate of the OCA at a temperature of 65° C. and a relative humidity (RH) of 90% is approximately 100 g/m$^2$·24 h or higher or approximately 1000 g/m$^2$·24 h or higher and approximately 5000 g/m$^2$·24 h or lower. By setting the moisture vapor transmission rate of the OCA to be approximately 100 g/m$^2$·24 h or higher, and especially approximately 1000 g/m$^2$·24 h or higher, it is possible to provide an OCA which exhibits excellent resistance to moist heat and which can effectively prevent clouding or white opacity caused by condensation of moisture.

It is desirable for the optical transparency, adhesive strength, and resistance to interlayer peeling of the OCA to be maintained for the working life of an article that uses the OCA. These characteristics can be determined by means of an accelerated aging test. Specifically, the OCA is placed between two test base materials. Next, the obtained laminate is placed in an environment having a high temperature and, if necessary, a high humidity. In some embodiments, the optical transparency of the OCA can be maintained after the OCA is aged at a temperature of approximately 85° C. or approximately 105° C. for a period of approximately 100 hours, approximately 200 hours or approximately 500 hours without adjusting the humidity (for example, in an oven having a relative humidity (RH) of approximately 10% or lower or approximately 20% or lower). In other embodiments, the optical transparency of the OCA can be maintained after the OCA is aged at a temperature of approximately 85° C. and a relative humidity (RH) of approximately 85% for a period of approximately 72 hours, approximately 100 hours or approximately 200 hours and then rapidly cooled (for example, within a period of several minutes). In some embodiments, the aged OCA has an average transmittance of approximately 85% or higher within the wavelength region of approximately 450 nm to approximately 650 nm and has a haze value of approximately 2% or lower.

Figure 1:
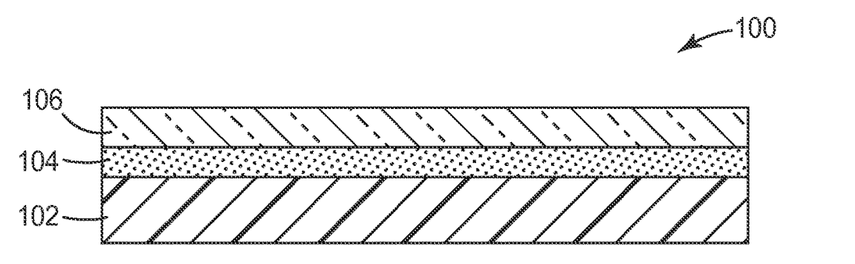
FIG. 1 is a cross sectional view of one embodiment of the optical laminate of the present invention.

One embodiment of the present invention provides an optical laminate which contains a first base material having at least one major surface, a second base material having at least one major surface, and the OCA, which is disposed between at least one major surface of the aforementioned first base material and at least one major surface of the aforementioned second base material so as to be in contact with at least one major surface of the aforementioned first base material and at least one major surface of the aforementioned second base material. FIG. 1 shows a cross-sectional view of the optical laminate of this embodiment.

An optical laminate (100) has a first base material (102), a second base material (106), and an OCA (104) disposed therebetween. The OCA (104) is in contact with the first base material (102) and the second base material (106). The optical laminate may further contain another base material (for example, a base material attached to the OCA either permanently or temporarily), another adhesive layer, or a combination thereof. The OCA may be in direct contact with major surfaces of the first base material and second base material, but may also be in contact with major surfaces of the first base material and second base material via one or more thin layers, such as primer layers or hard coat layers, disposed on these major surfaces.

The thickness of the OCA is generally approximately 5 μm or higher, approximately 10 μm or higher, approximately 15 μm or higher or approximately 20 μm or higher and approximately 1 mm or lower, approximately 250 μm or lower, approximately 200 μm or lower or approximately 175 μm or lower.

Other embodiments provide an optical laminate which contains an OCA and in which at least one of the first base material and second base material is an optical film. An optical film intentionally enhances, processes, controls, maintains, transmits, reflects, refracts, absorbs, retards or otherwise alters light incident upon the surface of the film. Examples of films contained in the optical laminate include a variety of optically functional materials, such as polarizers, interference polarizers, reflective polarizers, diffusers, colored optical films, mirrors, louvre optical films, light control films, transparent sheets, brightness-improving films, anti-glare films and anti-reflection films. Other examples of films used in the optical laminate include retardation plates such as quarter wavelength and half wavelength phase retardation optical elements. Examples of other optical films include optically clear films such as anti-scattering films and electromagnetic interference filters.

In some embodiments, the optical laminate may be an optical element, but may also be used in order to prepare an optical element. In the present invention, "optical element" means an article having an optical effect or optical usefulness. The optical element can be used in, for example, electronic displays, construction applications, communication applications, projection applications, optical communication applications and graphics applications. Particular optical elements include glazing materials (for example, windows and windscreens), screens, displays, Braun tubes and reflectors, but are not limited to these.

Examples of optically clear base materials include display panels, such as liquid crystal displays, OLED displays, touch panel modules, electrowetting type displays and Braun tubes, windows, glazing materials, optical components, such as reflectors, polarizing plates, diffraction lattices, mirrors and cover lenses, and other films, such as decorative films and other optical films, but optically clear materials are not limited to these.

Examples of other optically clear materials include polymer base materials, which include polycarbonates, polyesters (for example, poly(ethylene terephthalate) and poly(ethylene naphthalate)), polyurethanes, poly(meth)acrylates (for example, poly(methyl methacrylate)), poly(vinyl alcohol), polyolefins (for example, polyethylene, polypropylene, and polymerized cycloolefins), cellulose triacetate, glass base materials, and combinations thereof. For example, touch panel cover lenses can be prepared from glass, poly(methyl methacrylate) or polycarbonates.

The base material may have a metal or metal oxide electrically conductive layer. Examples of metals and metal oxides include gold, silver, copper, aluminum, indium tin oxide (ITO) or antimony tin oxide (ATO). Metals and metal oxides such as gold, silver, indium tin oxide (ITO) and antimony tin oxide (ATO) exhibit excellent transparency and can be advantageously used in transparent electrically conductive films in touch panel modules. Metals such as gold, silver, copper and aluminum are used as wiring materials around operating regions of touch panels.

In other embodiments, the base material may be a release liner. It is possible to use an optional release liner. Examples of typical release liners include liners prepared from paper (for example, craft paper) and polymer materials (for example, polyolefins such as polyethylene or polypropylene) polyesters (such as poly(ethylene terephthalate), ethylene vinyl acetate, or polyurethane. The release liner may be coated with a release agent such as a silicone-containing material or fluorocarbon-containing material. Examples of typical release liners are release liners commercially available as "T-30" and "T-10" from CP Film (Martinsville, Va.), each of which has a silicone release coating on a poly(ethylene terephthalate) film, but the release liner is not limited to these.

The release liner is removed to bond the optical film to another base material. Here, removing the release liner exposes the surface of the OCA, and the OCA can then be bonded to the surface of another base material. The OCA can be bonded permanently to another base material, but can also be bonded in a releasable manner.

The OCA of the present invention can be used directly on one or both sides of an optical element such as a polarizer. The polarizer may contain an additional layer such as an anti-glare layer, a protection layer, a reflective layer, a phase retardation layer, a wide angle compensation layer or a brightness-improving layer. In some embodiments, the OCA of the present invention can be used on one or both sides of a liquid crystal cell. The OCA of the present invention can be used to bond a polarizer to a liquid crystal cell. Other typical examples of optical laminates include use in cover lens LCD panels, use in touch panel LCD panels, use in cover lens touch panel modules, and combinations thereof.

The optical laminate of the present invention exhibits excellent heat resistance and resistance to moist heat. In addition, because the copolymer contained in the OCA contains substantially no acidic groups, it is possible to prevent, avoid, or suppress corrosion of electrically conductive layers in cases where the optical laminate contains metal or metal oxide electrically conductive layers. The optically clear adhesive and optical laminate of the present invention can be advantageously used in applications where optical transparency is required even in high temperature and high humidity environments, such as automotive touch panels and optical displays.

Examples

In the following examples, specific embodiments of the present disclosure are exemplified, but the present invention is not restricted thereto. All parts and percentages are by mass unless otherwise indicated.

The materials used in these examples are shown below in Table 1.

TABLE 1

| Trade name or abbreviation | Description | Supplier |
|---|---|---|
| 2EHA | 2-ethylhexyl acrylate | Nippon Shokubai Co., Ltd. (Chiyoda-ku, Tokyo, Japan) |
| BA | n-butyl acrylate | Mitsubishi Chemical Corporation (Chiyoda-ku, Tokyo, Japan) |
| IBXA | Isobornyl acrylate | Osaka Organic Chemical Industry (Osaka City, Osaka Prefecture, Japan) |
| HEA | 2-hydroxyethyl acrylate | Nippon Shokubai Co., Ltd. (Chiyoda-ku, Tokyo, Japan) |
| HPA | 2-hydroxypropyl acrylate | Osaka Organic Chemical Industry (Osaka City, Osaka Prefecture, Japan) |
| AA-6 | MMA macromonomer Molecular weight approximately 5000 | Toagosei Co., Ltd. (Minato-ku, Tokyo, Japan) |
| NVP | N-vinyl pyrrolidone | Nippon Shokubai Co., Ltd. (Chiyoda-ku, Tokyo, Japan) |
| KBM403 | Silane coupling agent 3-glycidoxypropyltrimethoxysilane | Shin-Etsu Chemical Co., Ltd. (Chiyoda-ku, Tokyo, Japan) |
| Clarity (registered trademark) LA4285 | MMA-BA block copolymer Molecular weight approximately 100,000 MMA approximately 50% | Kuraray Co., Ltd. (Chiyoda-ku, Tokyo, Japan) |
| Clarity (registered trademark) LA2250 | MMA-BA block copolymer Molecular weight approximately 100,000 MMA approximately 30% | Kuraray Co., Ltd. (Chiyoda-ku, Tokyo, Japan) |
| HDDA | 1,6-hexanediol diacrylate | BASF Japan (Minato-ku, Tokyo, Japan) |
| Coronate (registered trademark) L-45 | Tolylene diisocyanate-based crosslinking agent | Soken Chemical & Engineering Co., Ltd. (Toshima-ku, Tokyo, Japan) |
| Irgacure (registered trademark) 651 | Photopolymerization initiator 2,2-dimethoxy-2-phenylacetophenone | BASF Japan (Minato-ku, Tokyo, Japan) |
| V-65 | Thermal polymerization initiator 2,2'-azobis(2,4-dimethylvaleronitrile) | Wako Pure Chemical Industries, Ltd. (Osaka City, Osaka Prefecture, Japan) |

Test Methods

The OCA sheet was evaluated using the following test methods.

(1) Accelerated Aging Test

A sample is prepared by placing an OCA sheet having a thickness of 100 μm and cut to a size of 55 mm×80 mm between a polycarbonate (PC) film having a size of 55 mm×80 mm and a thickness of 2.0 mm (Panlite trademark), manufactured by Teijin, Ltd., Chiyoda-ku, Tokyo, Japan) and an ITO-covered PET (ITO-PET) film having a size of 55 mm×80 mm and a thickness of 125 μm (Tetolight TCF, manufactured by Oike and Co., Ltd., Kyoto City, Kyoto Prefecture, Japan) and then laminating these materials. The obtained sample is placed in an autoclave (50° C., 0.5 MPa) for 30 minutes, and then placed in an oven set to a temperature of 105° C. or 85° C. and a relative humidity (RH) of 85%. After 100 hours, the sample is removed from the oven and cooled to room temperature, after which the presence or absence of bubbling or peeling in the laminate is observed visually. A laminate in which no bubbling or peeling is observed is evaluated as A, a laminate in which slight bubbling is observed is evaluated as B, a laminate in which bubbling is observed is evaluated as C, and a laminate in which peeling occurs is evaluated as D.

In addition to visual observations, the presence or absence of white opacity in the OCA, and the degree thereof, are evaluated by means of the haze value of the OCA. The haze value of the sample is measured before and after an accelerated aging test at a temperature of 85° C. and a relative humidity (RH) of 85% in accordance with JIS K 7136 (2000) using an NDH-5000W haze meter (manufactured by Nippon Denshoku Industries Co., Ltd.). The haze value following the accelerated aging test is measured immediately after cooling the sample to room temperature within 5 minutes. The haze value of the OCA only is obtained by using the PC film and the ITO-PET film as background. The OCA of the present invention particularlyhas a haze value of 2% or lower following the accelerated aging test.

(2) Moisture Vapor Transmission Rate (MVTR)

The moisture vapor transmission rate of the OCA sheet is determined in accordance with JIS Z 0208 (1976). An OCA sheet having a thickness of 100 μm is laminated on, and supported by, gauze. With the OCA sheet side downwards, the OCA sheet is held in a fixed position on a water-containing cup having a diameter of 6 cm, and the gap between the OCA and the cup is sealed. The obtained sample is placed for approximately 24 hours in an oven set to a temperature of 65° C. and a relative humidity (RH) of 90% with the cup upright (that is, the water is not in contact with the sample). The moisture vapor transmission rate of the OCA is calculated in terms of $g/m^2 \cdot 24$ h by measuring the loss in weight of the sample due to transmission of moisture until the end of the test period.

(3) ITO Circuit Corrosion Test

An OCA sheet is laminated on a PET film having a thickness of 25 μm (Lumirror (trademark) T60, manufactured by Toray Industries, Inc., Chuo-ku, Tokyo, Japan), cut to a size of 25 mm×250 mm, and then laminated on an ITO-PET film, on which is formed an ITO circuit having a prescribed pattern, in such a way that the ITO circuit is in contact with the OCA sheet. The obtained sample is placed for 1 week in an oven set to a temperature of 65° C. and a relative humidity (RH) of 90%. The increase in resistance of the ITO circuit ([resistance value following test—resistance value before test]/resistance value before test) is expressed as a percentage.

(4) Copper Corrosion Test

An OCA sheet is laminated on a PET film having a thickness of 25 μm (Lumirror (trademark) T60, manufactured by Toray Industries, Inc., Chuo-ku, Tokyo, Japan), cut to a size of 25 mm×250 mm, and a glass, on which a thin copper plate having a thickness of 25 μm is bonded by means of double-sided adhesive tape, is laminated on this cut sample in such a way that the thin copper plate is in contact with the OCA sheet. The obtained sample is placed in an oven set to a temperature of 65° C. and a relative humidity (RH) of 90%. After 1 week, the sample is removed from the oven and allowed to stand for 2 hours or longer, after which the presence or absence of discoloration in the thin copper plate is observed visually.

(5) Viscoelasticity Characteristics

The viscoelasticity characteristics of the OCA sheet are measured using an ARES dynamic viscoelasticity measuring device (manufactured by T.A. Instruments Japan, Shinagawa-ku, Tokyo, Japan). A sample is prepared by laminating the OCA sheet at a thickness of 2 mm and punching out a hole having a diameter of 8 mm. Using measurement conditions of 1 Hz, a temperature range of −20° C. to 150° C. and a rate of temperature increase of 5° C./min, the storage modulus (G') of the sample at 25° C. is recorded.

Examples 1 to 4 and Comparative Examples 1 to 5

The materials disclosed in column A in Table 2 and 0.04 parts by mass of Irgacure (registered trademark) 651 were mixed in a 225 mL glass jar. After purging dissolved oxygen with nitrogen gas, the mixture was irradiated with ultraviolet radiation at an irradiation intensity of 0.5 mW/cm² for several minutes using a low-pressure mercury lamp so as to effect partial polymerization and obtain a viscous liquid having a viscosity of approximately 1500 mPa·s. The corresponding materials disclosed in column B in Table 2 and 0.15 parts by mass of an additional polymerization initiator (Irgacure (registered trademark) 651) were then added to the obtained viscous liquid, and stirred thoroughly.

This mixture was subjected to vacuum defoaming, coated at a thickness of 175 μm on a polyester film having a thickness of 50 μm and subjected to release treatment (a release film), covered with the above-mentioned release film in order to remove oxygen, which inhibits polymerization, and then irradiated from both sides with ultraviolet radiation at an irradiation intensity of 1.0 mW/cm² for approximately 4 minutes using a low-pressure mercury lamp, thereby obtaining an OCA sheet.

Comparative Example 6

The materials disclosed in column A in Table 2 and 0.12 parts by mass of V-65 were dissolved in 100 parts by mass of a 50/50 (mass ratio) mixed solvent of ethyl acetate (EtOAc, manufactured by Wako Pure Chemical Industries, Ltd., Osaka City, Osaka Prefecture, Japan) and methyl ethyl ketone (MEK, Wako Pure Chemical Industries, Ltd., Osaka City, Osaka Prefecture, Japan) and mixed in a 225 mL glass jar. After purging dissolved oxygen with nitrogen gas, the mixture was stirred for 24 hours at 45° C. so as to effect partial polymerization and obtain a viscous liquid having a viscosity of approximately 1500 mPa·s. The materials disclosed in column B in Table 2 were then added to this viscous liquid and mixed thoroughly.

The obtained solution was coated on a polyester film (a release film) having a thickness of 50 μm using a knife coater so as to obtain a dried thickness of 100 μm. The coated film was dried in an oven for 3 minutes at 65° C. and then for 3 minutes at 110° C., after which the surface of the OCA sheet was covered with a polyester film (a release film) having a thickness of 38 μm.

The compositions of the OCA sheets of Examples 1 to 4 and Comparative Examples 1 to 6 are shown in Table 2, and the evaluation results are shown in Table 3.

TABLE 2

(in the table, the numerical values are parts by mass)

| | A | | | | | | | B | | | | |
|---|---|---|---|---|---|---|---|---|---|---|---|---|
| | 2EHA | BA | IBXA | HEA | HPA | AA-6 | NVP | KBM 403 | LA 4285 | LA 2250 | HDDA | L-45 |
| Example 1 | | 45 | 10 | | 35 | 10 | | 0.2 | | | 0.06 | |
| Example 2 | | 45 | 10 | | 35 | 10 | | 0.2 | | | 0.06 | |
| Example 3 | 40 | | 10 | | 35 | 15 | | 0.2 | | | 0.06 | |
| Example 4 | | 50 | 15 | 20 | | 5 | | 0.2 | | | 0.06 | |
| Comparative Example 1 | 35 | | 15 | 30 | | | | | | | 0.06 | |
| Comparative Example 2 | | 65 | 15 | | 10 | 10 | | 0.2 | | | 0.06 | |
| Comparative Example 3 | | 50 | 10 | | 35 | | | 0.2 | 5 | | 0.06 | |
| Comparative Example 4 | | 50 | 10 | | 35 | | | 0.2 | | 5 | 0.06 | |
| Comparative Example 5 | | 45 | | | 35 | | 10 | 0.2 | | | 0.06 | |
| Comparative Example 6 | | 45 | 10 | | 35 | | | 0.2 | | | | 0.6 |

TABLE 3

| | Accelerated aging test | | Haze | | | Corrosion test | | |
|---|---|---|---|---|---|---|---|---|
| | 105° C. | 85° C./ RH85% | Initial haze value | Haze value after test | MVTR (g/m2 · 24 h) | Change in ITO resistance | Copper discoloration | Viscoelasticity characteristics G'(Pa) |
| Example 1 | A | A | <2% | <2% | 1440 | <10% | None | $2.7 \times 10^5$ |
| Example 2 | A | A | <2% | <2% | 1440 | <15% | None | $2.7 \times 10^5$ |
| Example 3 | A | A | <2% | <2% | — | <10% | None | — |
| Example 4 | B | A | <2% | <2% | — | <10% | None | — |
| Comparative Example 1 | D | D | <2% | <2% | 1680 | <10% | None | — |
| Comparative Example 2 | A | A | <2% | 10%≤ | 580 | <10% | None | — |
| Comparative Example 3 | D | C | <2% | <2% | — | <10% | None | — |
| Comparative Example 4 | — | — | 10%≤ | — | — | — | — | — |
| Comparative Example 5 | A | A | — | — | — | — | Yes | — |
| Comparative Example 6 | D | D | <2% | <2% | — | — | — | — |

What is claimed is:

1. An optically clear adhesive comprising:
   a copolymer of a monomer mixture comprising:
   25 to 80 parts by mass of an alkyl (meth)acrylate;
   15 to 50 parts by mass of a hydroxyl group-containing monomer;
   5 to 25 parts by mass of a macromer having a glass transition temperature (Tg) of 50° C. or higher, wherein the monomers that constitute the main chain of the macromer includes methacrylate monomers, styrene-based monomers or acrylonitrile, and wherein the number molecular weight of the macromer in Dalton is 2000 or higher and 50000 or lower; and
   a crosslinkable monomer comprising difunctional (meth)acrylates or polyfunctional (meth)acrylates, wherein when the total quantity of the alkyl (meth)acrylate, the hydroxyl group-containing monomer, and the macromer is 100 parts by mass, the crosslinkable monomer is at a quantity of 0.01 parts by mass or higher and 5 parts by mass or lower,
   wherein the copolymer contains substantially no acidic groups, wherein the acid value of the copolymer that contains substantially no acidic groups is 5 mg KOH/g or lower.

2. The optically clear adhesive according to claim 1, wherein the copolymer comprises substantially no nitrogen-containing sites, wherein the nitrogen content of the copolymer that contains substantially no nitrogen-containing sites is 1 mass % or lower.

3. The optically clear adhesive according to claim 1, wherein a main chain of the macromer has methyl methacrylate units.

4. The optically clear adhesive according to claim 1, wherein the optically clear adhesive further comprises a silane coupling agent.

5. The optically clear adhesive according to claim 1, wherein the alkyl (meth)acrylate comprises n-butyl acrylate.

6. An optical laminate comprising:
a first base material having a major surface;
a second base material having a major surface; and
the optically clear adhesive described in claim 1 disposed between the major surface of the first base material and the major surface of the second base material so as to be in contact with the major surface of the first base material and the major surface of the second base material.

* * * * *